A. F. CIZEK.
SHIP PROPELLER.
APPLICATION FILED AUG. 18, 1914.

1,134,670. Patented Apr. 6, 1915.

WITNESSES:
W. Wight
D. Fearon.

INVENTOR
Albert F. Cizek
BY
P. L. Elliott
ATTORNEY.

UNITED STATES PATENT OFFICE.

ALBERT F. CIZEK, OF TACOMA, WASHINGTON.

SHIP-PROPELLER.

1,134,670.

Specification of Letters Patent.

Patented Apr. 6, 1915.

Application filed August 18, 1914. Serial No. 857,430.

*To all whom it may concern:*

Be it known that I, ALBERT F. CIZEK, a citizen of the United States, and a resident of Tacoma, in the county of Pierce and State of Washington, have invented certain new and useful Improvements in Ship-Propellers, of which the following is a specification.

This invention relates to the propulsion of vessels and especially to the form and arrangement of the propellers, and has for its objects to produce a stronger tractile force with a given power, thus increasing the speed of the vessel, to reduce vibration of the vessel, to prevent racing of the propeller, and to reduce the danger to other vessels common to twin propellers as at present arranged. I attain these and other objects by the devices, mechanisms and arrangements illustrated in the accompanying drawings, in which—

Figure 1:
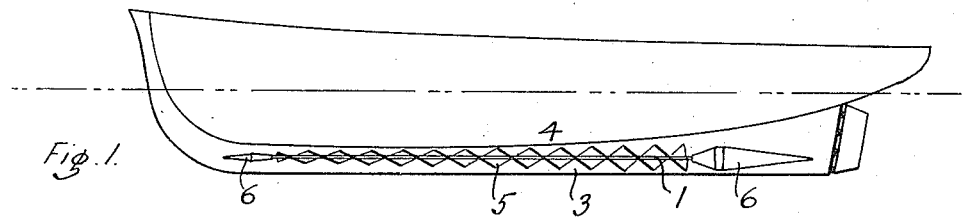
Figure 2:
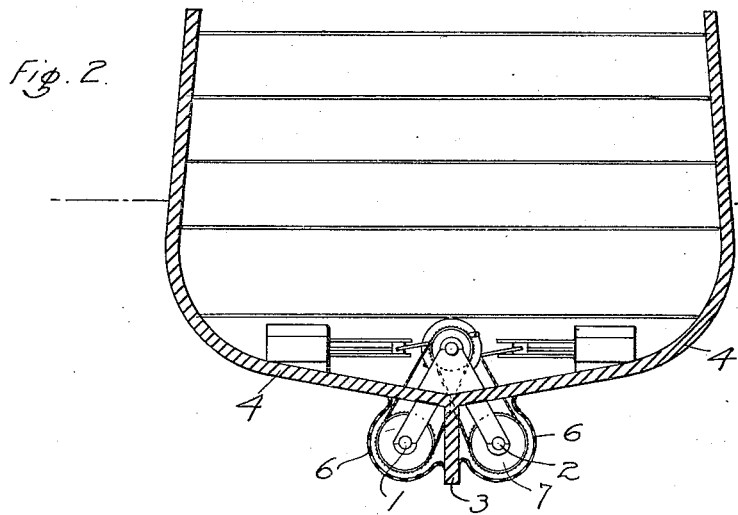
Figure 3:
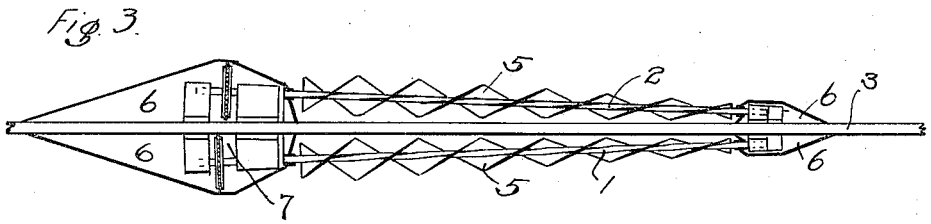

Figure 1 is a side elevation of a vessel equipped with my improved propeller; Fig. 2 is a cross-section thereof; and Fig. 3 is a bottom plan thereof.

Similar numerals of reference refer to similar parts throughout the several views.

Referring to the drawings, the propeller shafts 1 and 2 are mounted on each side of the keel 3 of the vessel and extend practically from end to end thereof being positioned beneath the hull 4 of the vessel. The propellers each consist of a continuous screw propeller surface 5 secured to the said shafts 1 and 2. The pitch of the screw surface is substantially uniform from end to end of the shafts but the diameter of its periphery increases from stem to stern so that the screws are formed from a cone or other non-cylindrical shape. The shafts 1 and 2 are also positioned so that their axes are not parallel either with the axis of the vessel or with each other, in that their rear ends are farther apart than their forward ends, and I prefer to so proportion the parts that the inner lines of the screw cones lie parallel with each other and with the keel which is positioned between them, thus the outer lines of the screw cones lie in undisturbed water for the entire length of the propeller and the rear portions thereof are practically just as effective as are the forward portions as is clearly seen in Fig. 3.

The propellers are supported at their ends, or at intermediate points, by suitable bearings which are housed in suitable streamline forms 6 to reduce their resistance when in motion through the water. The driving gear 7 is mounted in one of said housings (Fig. 2) and may consist in any mechanism connecting the engines, or other prime movers, to one or both of the shafts 1 and 2. In the drawings the transmitting mechanism is indicated as consisting of suitable sprocket wheels and chains connecting the engine shaft with the propeller shafts. I have shown the driving gear as mounted in the rear housing of the propeller shaft, but I do not wish to confine myself to this particular position as it may, in some circumstances, be best to place it in the forward or in any intermediate position. The shafts may be driven in the same sense in which case the two screws are similar in all respects, or they may be rotated in opposite senses and in this case the two screws would be right- and left-handed respectively.

It is evident that a screw propeller of this design will have a far greater grip on the water and will disturb it less than will a shorter propeller; especially is this true when there is a considerable increase in diameter from stem to stern and also when the shafts are inclined to the direction of motion as shown. Since the head resistance of the vessel must be overcome by the grip of the propellers on the water it is evident that a greater speed can be attained with this system than with that at present in use. Since the propellers are under the vessel and extend practically from end to end thereof, it follows that at no time can they be out of the water nor are they but slightly immersed therein and therefore they cannot race. They will always lie sufficiently deep to be practically in still water irrespective of the waves on the surface. Since the propellers do not project from the stern of the vessel, as do twin propellers now used, it follows that they cannot endanger other boats in their vicinity.

Having described my invention, what I claim is:—

In a ship propeller, the combination with a vessel; of a pair of screw propellers mounted on each side of the central axis thereof, each of said propellers extending substantially from end to end of the vessel, the axes thereof each equally and oppositely diverging from the said central axis from stem to stern, and each being of increasing diameter from stem to stern whereby their adjacent edges lie substantially parallel; and means for driving the propeller.

ALBERT F. CIZEK.

Witnesses:
S. F. McANALLY,
G. E. MOE.